United States Patent

[11] 3,633,940

[72] Inventor Leo G. Sinnard
 111 1/2 N. Poplar St., Assumption, Ill. 62510
[21] Appl. No. 24,724
[22] Filed Apr. 1, 1970
[45] Patented Jan. 11, 1972

[54] FIFTH WHEEL WITH SAFETY FEATURES
 5 Claims, 2 Drawing Figs.
[52] U.S. Cl. ..................................... 280/432
[51] Int. Cl. ..................................... B62d 53/10
[50] Field of Search............................ 280/432

[56] References Cited
 UNITED STATES PATENTS
 2,723,865  11/1955  Leoni............................ 280/432
 2,738,205   3/1956  Vaugoyeau.................... 280/432
 2,738,988   3/1956  Claussen et al. ............... 280/432
 2,833,561   5/1958  Vaugoyeau..................... 280/438
 2,959,429  11/1960  Lavelle.......................... 280/432

FOREIGN PATENTS
 1,078,082   5/1954  France ........................... 280/432
 1,100,950   4/1955  France ........................... 280/432
 1,450,791   7/1966  France ........................... 280/432
   764,435  12/1956  Great Britain................. 280/432

Primary Examiner—Leo Friaglia

ABSTRACT: A safety fifth wheel device for mounting upon a tractor or other vehicle. This device is secured in a normal manner by a central kingpin which is received within a slot portion of the device. In the event that a kingpin severs or comes loose the device is so constructed so as to prevent loss of control and detachment of the trailer.

PATENTED JAN 11 1972

3,633,940

INVENTOR.
LEO G. SINNARD

FIFTH WHEEL WITH SAFETY FEATURES

This invention relates to a fifth wheel device, and more particularly to a fifth wheel mechanism for tractor-trailer vehicles.

It is therefore the main object of the present invention to provide a fifth wheel which will have safety features in its construction so as to maintain control of the vehicle in the event that a kingpin fractures or the like.

Another object of this invention is to provide a device of the type described which will have all of its elements easily assembled and during the fracture or looseness of a kingpin relative to the device, one of the device's elements will be allowed to rotate back and forth as the trailer or other vehicle is turned, this being possible by means of a vertical and horizontal tongue and groove.

A further object of this invention is to provide a fifth wheel device which will serve to prevent the trailer portion of the vehicle from running wild and will allow the tractor to continue to pull and control the trailer without the central fastener element.

Other objects of the invention are to provide a fifth wheel with safety features which is simple in design, inexpensive to manufacture, rugged in construction, easy to use and efficient in operation.

Figure 1:
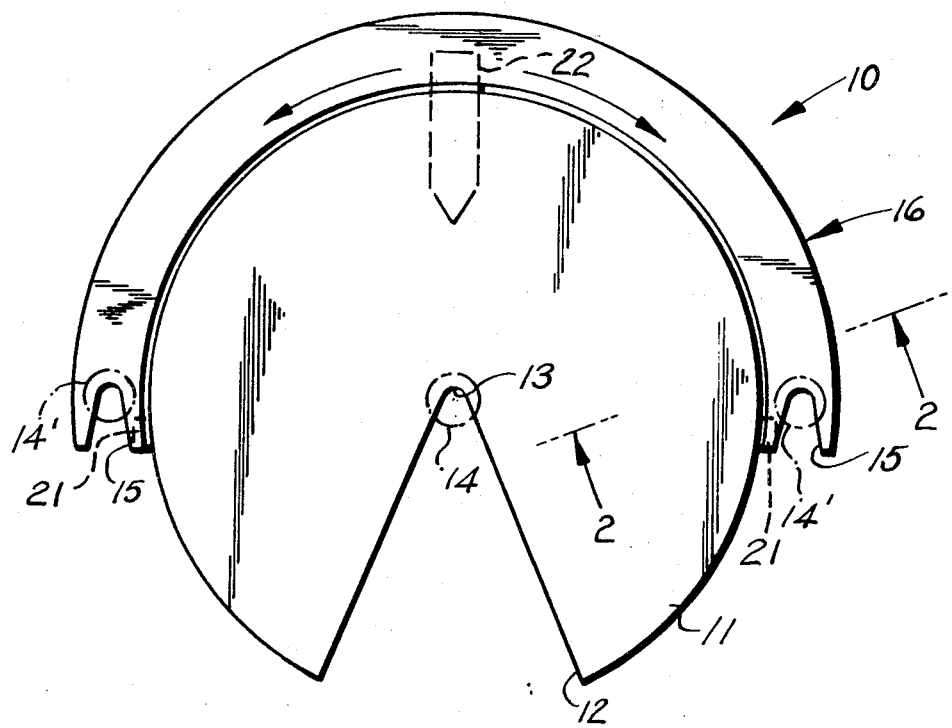
Figure 2:
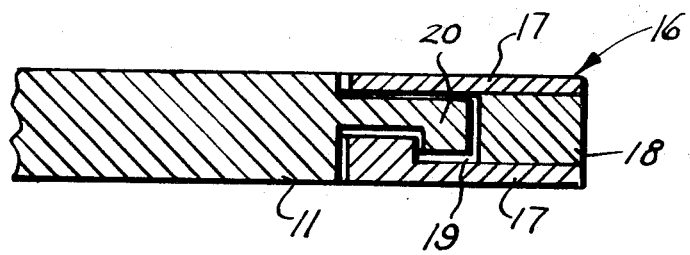

These and other objects will be readily evident upon a study of the following specification and the accompanying drawing wherein:

FIG. 1 is a top plan view of the present invention showing the kingpin element in phantom lines; and FIG. 2 is an enlarged cross-sectional view taken along the lines 2—2 of FIG. 1.

According to this invention, a fifth wheel 10 is shown to include a disc member 11 having a triangular cutout 12, the apex portion 13 being arcuately curved to engage the shank portion (not shown) of the central kingpin 14.

It shall be noted that kingpin 14 and kingpins 14' are secured to the trailer (not shown) in a well-known manner.

Kingpins 14' are equally spaced apart from kingpin 14 and are carried within cutouts 15 on the ends of a semicircular ring member 16 and are releasably secured to the ring member, as by detachable latch pins or the like.

Ring member 16 includes a pair of arcuately configured plates 17 between which is fixedly secured an arcuate spacer member 18. A groove 19 defined by plates 17 and spacer 18 freely carries the tongue portion 20 of disc 11, the combination providing a means of preventing the trailer from running wild in the event of the fracture or looseness of kingpin 14.

In use, disc 11 which engages kingpin 14 of the trailer functions in a normal manner according to the prior art. If kingpin 14 becomes loose or fractures and is severed completely, the trailer may still be controlled because the kingpins 14' within the cutouts 15 of ring member 16 will render disc 11 secure, but allowing it to rotate back and forth. The above-mentioned action is controlled by means of the tongue 20 of disc 11 being retained within groove 19 of the semicircular ring member 16.

It shall further be noted that with the rupturing or severing of kingpin 14, the inherent structure of the fifth wheel 10 will enable the tractor to continue to pull and control the trailer whereas the prior art types are unable to do so.

It shall also be recognized that a stop bar 22 is radially positioned and secured fixedly by suitable means (not shown) to the underside of disc member 11 and extends outwardly to the underside of ring member 16. A stop block is secured fixedly to the underside and at the ends of ring member 16.

The combination of the stop bar 22 of disc member 11 and the stop block 21 of ring member 16 serve to prevent the tractor and trailer from jackknifing far enough to do any damage.

The stop blocks 21 will let the semicircular ring member 16 rotate approximately 90° in either direction, thereby allowing the trailer and tractor to be handled normally, but if the trailer gets out of control and starts to jackknife, the stop blocks 21 cannot travel past the extending stop bar 22, thus preventing the jackknifing condition from doing any damage.

What I now claim is:

1. A fifth wheel apparatus for trailer trucks, comprising in combination, a disc member supported on a tractor for engaging a central kingpin of said trailer, an arcuate-shaped tongue portion carried by said disc member engaging a semicircular ring member slideably guided by said tongue portion about the periphery of said disc, a pair of auxiliary kingpins carried by said trailer, and means on the ends of the said ring member to abuttingly engage one of the respective auxiliary kingpins so that such engagement renders the ring members stationary relative to said trailer.

2. The combination according to claim 1, wherein said disc member of said apparatus is provided with a triangular cutout portion, the apex of said triangular cutout portion being arcuate in order to smoothly and rotatably engage the central kingpin which secures said device to the tractor and trailer and said arcuate tongue portion of said disc extends outward from the outer periphery of said disc in order to freely and rotatably engage a similar-shaped groove of said ring member of said apparatus.

3. The combination according to claim 2, wherein said semicircular ring member of said apparatus includes a pair of spaced apart arcuate plates, said plates being secured on the outside of an arcuate spacer member, said spacer and said plates defining said groove which receives said tongue of said disc, said combination of said ring member and said disc forming an assembly for preventing said trailer from running wild in the event of the fracture of said central kingpin carried within said apex portion of said cutout of said disc, said tongue riding within said groove of said ring member allowing the trailer to continue to pull and control said trailer when turning said vehicle.

4. The combination according to claim 3, wherein the ends of said ring member of said apparatus are provided with cutouts which engage a respective one of said pair of auxiliary kingpins of said trailer, said kingpins providing stability for said fifth wheel apparatus in the event of the severing or loosening of said kingpins received within said cutout of said disc, said ring member and said kingpins received by said ring member in combination with said tongue of said disc being received within said groove of said ring member causing said disc member to remain centered when said kingpin of said disc member is severed or loosened.

5. The combination according to claim 4 wherein said fifth wheel apparatus includes stop bar and block means for preventing damage during a jackknifing condition of said trailer and tractor, said stop bar being elongated in configuration and radially positioned and secured to said disc member, a portion of said stop bar extending outward free from said disc member beneath said ring member and said stop blocks being secured fixedly to the ends of said semicircular ring member, said stop blocks and said stop bar combination allowing said ring member to rotate approximately 90° in either direction and thereby providing a means for normally handling said tractor and trailer, and if such trailer gets out of control and starts a jackknifing condition, said stop blocks are prevented from traveling passed said extending stop bar which prevents any damage during a jackknifing condition.

* * * * *